US012522371B2

(12) United States Patent
Fukuchi et al.

(10) Patent No.: US 12,522,371 B2
(45) Date of Patent: Jan. 13, 2026

(54) AIRCRAFT COOLING SYSTEM AND AIRCRAFT

(71) Applicant: HONDA MOTOR CO., LTD., Tokyo (JP)

(72) Inventors: Yuichi Fukuchi, Wako (JP); Takuya Kubota, Wako (JP); Hikari Hirayanagi, Wako (JP); Azuki Ichikawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/605,226

(22) Filed: Mar. 14, 2024

(65) Prior Publication Data

US 2024/0317417 A1    Sep. 26, 2024

(30) Foreign Application Priority Data

Mar. 20, 2023   (JP) ................................. 2023-044177

(51) Int. Cl.
   *B64D 33/10*    (2006.01)
   *B64C 27/605*   (2006.01)
   *B64C 29/00*    (2006.01)

(52) U.S. Cl.
   CPC ............ *B64D 33/10* (2013.01); *B64C 27/605* (2013.01); *B64C 29/0025* (2013.01)

(58) Field of Classification Search
   CPC ........ B64U 20/94; B64D 33/08; B64D 33/10; B64D 13/006
   See application file for complete search history.

(56) References Cited

U.S. PATENT DOCUMENTS

| 10,150,560 | B2  | 12/2018 | Tighe et al. | |
| 2019/0161179 | A1* | 5/2019 | Uebori | B64U 10/14 |
| 2021/0389054 | A1* | 12/2021 | Welsh | B64C 27/32 |
| 2022/0227490 | A1* | 7/2022 | Tian | B64U 20/94 |

* cited by examiner

*Primary Examiner* — Ashesh Dangol
(74) *Attorney, Agent, or Firm* — Rankin, Hill & Clark LLP

(57) ABSTRACT

An aircraft cooling system includes: a rotor capable of generating thrust in a vertical direction; a heat generating member disposed below the rotor; a support member (a boom) that supports the heat generating member; a structure (a second fairing) protruding from the support member toward the rotor; and a heat exchanger (a surface heat exchanger) provided in the structure. A refrigerant heated by the heat generating member is introduced to an inlet (a fairing inlet) provided in the heat exchanger, and the refrigerant cooled by the heat exchanger is supplied to the heat generating member from an outlet (a fairing outlet) provided in the heat exchanger.

10 Claims, 5 Drawing Sheets

FIG. 5
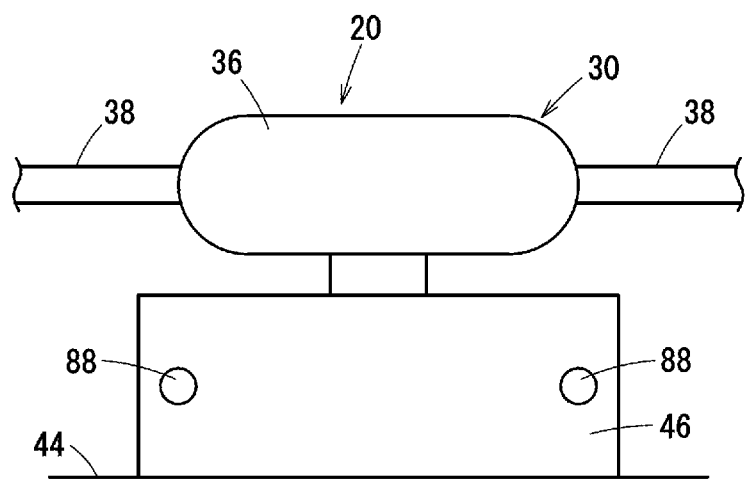
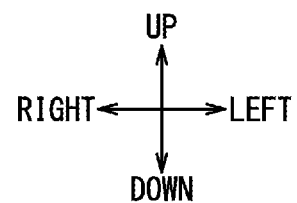

AIRCRAFT COOLING SYSTEM AND AIRCRAFT

CROSS-REFERENCE TO RELATED APPLICATIONS

This application is based upon and claims the benefit of priority from Japanese Patent Application No. 2023-044177 filed on Mar. 20, 2023, the contents of which are incorporated herein by reference.

BACKGROUND OF THE INVENTION

Field of the Invention

The present invention relates to an aircraft cooling system for cooling a heat generating member of an aircraft, and to an aircraft.

Description of the Related Art

A vertical take-off and landing aircraft (VTOL aircraft) includes VTOL rotors and cruise rotors. U.S. Pat. No. 10,150,560 B2 discloses a technique for cooling controller components of a VTOL aircraft. In this VTOL aircraft, the VTOL rotors are supported by booms. The controller components are accommodated within the booms. An inlet is formed on the upper surface of each boom. With this structure, the downwash generated by the VTOL rotors is taken into the boom through the inlet to cool the controller components.

SUMMARY OF THE INVENTION

In some cases, the VTOL rotor is stopped while the VTOL aircraft is cruising. When the VTOL rotor is stopped, downwash does not occur. Therefore, with the technique described U.S. Ser. No. 10/150,560 B2, the heat generating member having a large thermal inertia such as a motor cannot be sufficiently cooled.

An object of the present invention is to solve the above-mentioned problem.

An aircraft cooling system of the present invention comprises: a rotor configured to generate thrust in a vertical direction; a heat generating member disposed below the rotor; a support member configured to support the heat generating member; a structure protruding from the support member toward the rotor; and a heat exchanger provided in the structure, wherein a refrigerant heated by the heat generating member is introduced to an inlet provided in the heat exchanger, and the refrigerant cooled by the heat exchanger is supplied to the heat generating member from an outlet provided in the heat exchanger.

An aircraft of the present invention comprises the above-described aircraft cooling system.

According to the present invention, it is possible to provide an aircraft cooling system and an aircraft that are capable of satisfactorily cooling a heat generating member.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 5 is a schematic view showing part of a vertical take-off and landing aircraft according to a modified embodiment.

DETAILED DESCRIPTION OF THE INVENTION

An aircraft cooling system and an aircraft according to an embodiment will be described with reference to the drawings. In the present embodiment, a case where the aircraft is a vertical take-off and landing aircraft will be described as an example, but the present invention is not limited thereto.

1. Configuration of Vertical Take-Off and Landing Aircraft 10

Figure 1:
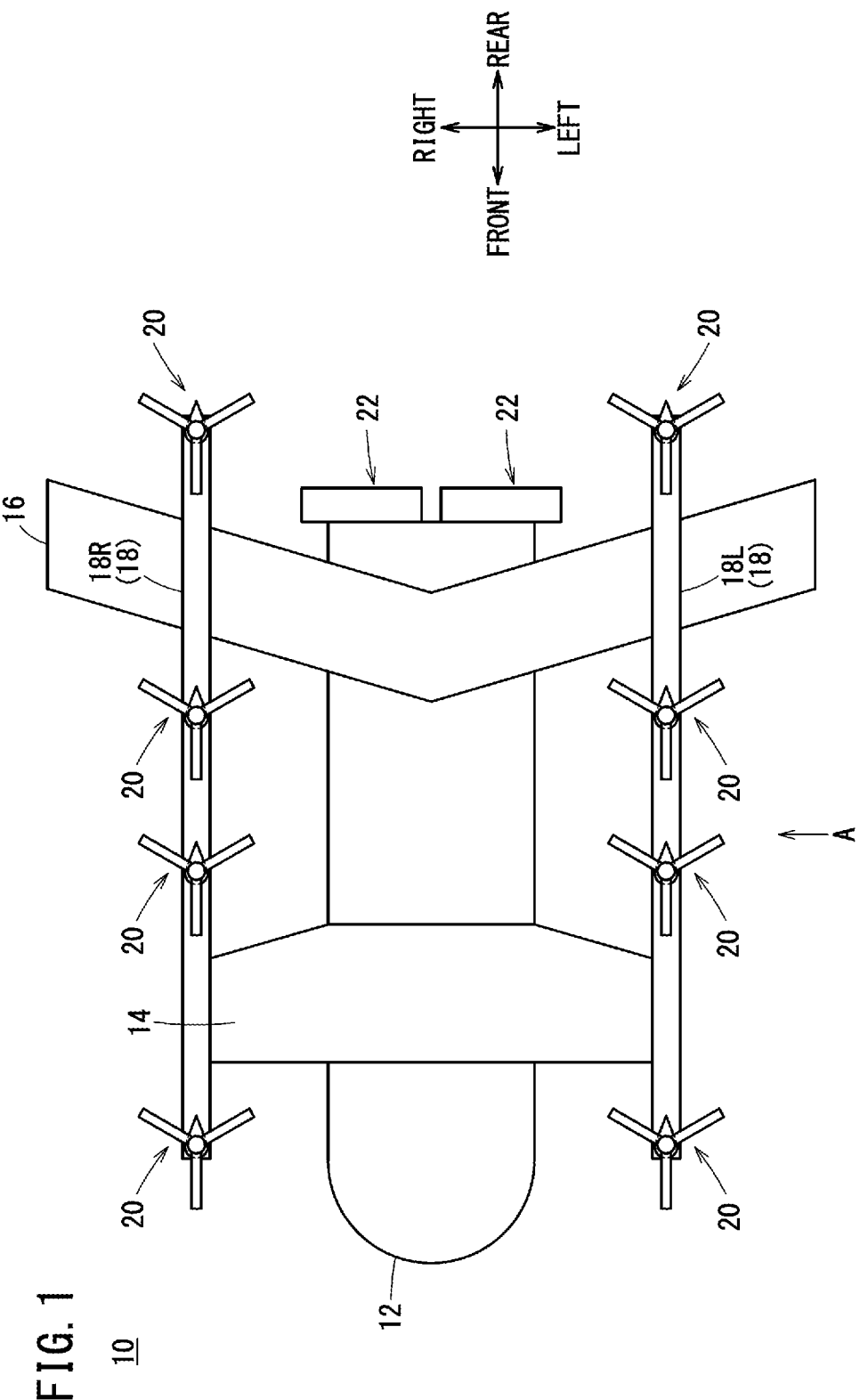
FIG. 1 is a schematic view of a vertical take-off and landing aircraft.

FIG. 1 is a schematic view of a vertical take-off and landing aircraft 10. The vertical take-off and landing aircraft 10 (VTOL aircraft 10) is an electric vertical take-off and landing aircraft (eVTOL aircraft). The VTOL aircraft 10 includes a fuselage 12, a front wing 14, a rear wing 16, two booms 18 (support members), eight VTOL rotor units 20, and two cruise rotor units 22.

The front wing 14 and the rear wing 16 are connected to the fuselage 12. The front wing 14 is disposed forward of the rear wing 16. The front wing 14 and the rear wing 16 generate lift as the VTOL aircraft 10 moves forward.

Figure 2:
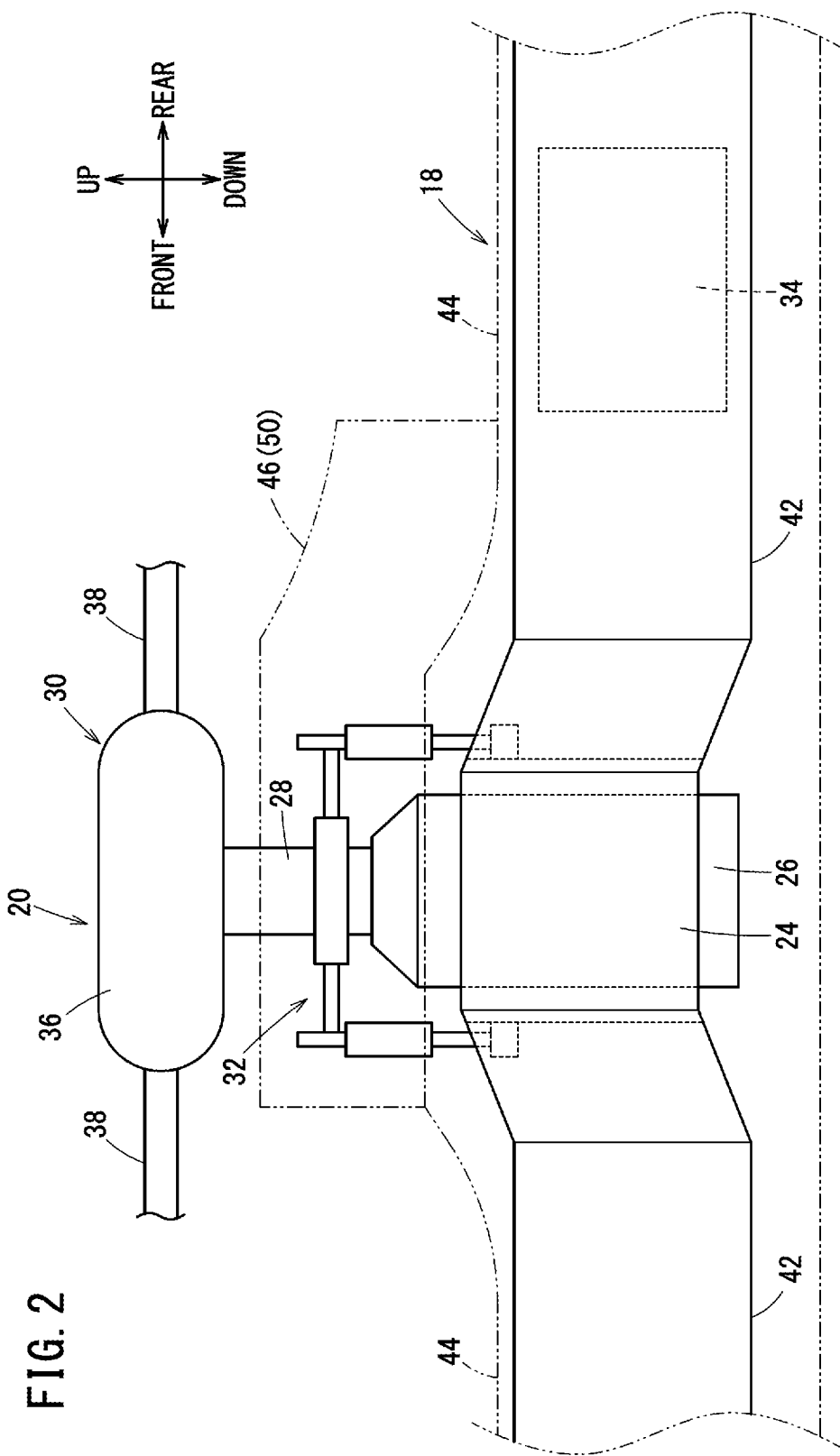
FIG. 2 is a schematic view showing part of a vertical take-off and landing aircraft equipped with an aircraft cooling system according to an embodiment.

The booms 18 are supported by the front wing 14 and the rear wing 16. Each boom 18 includes a plurality of pipes 42 (FIG. 2) arranged in a row in the extending direction of the boom 18. Each boom 18 further includes a first fairing 44 (FIG. 2). The booms 18 are spaced apart from the fuselage 12. A boom 18L of the two booms 18 is located on the left side of the fuselage 12. A boom 18R of the two booms 18 is located on the right side of the fuselage 12.

Four VTOL rotor units 20 are supported by the boom 18L. The other four VTOL rotor units 20 are supported by the boom 18R. On the other hand, the two cruise rotor units 22 are supported by the fuselage 12.

2. Configurations of VTOL Rotor Unit 20 and Periphery Thereof

FIG. 2 is a schematic view showing part of the vertical take-off and landing aircraft 10 provided with an aircraft cooling system 60 according to the present embodiment. FIG. 2 shows the VTOL rotor unit 20 and peripheral devices thereof. More specifically, FIG. 2 shows the VTOL rotor unit 20 (indicated by an arrow A in FIG. 1) disposed rearward of the front wing 14, and peripheral devices thereof.

The VTOL rotor units 20 each include a mount 24, a motor 26, a power transmission mechanism 28, a VTOL rotor 30, a variable pitch mechanism 32, and an inverter 34. The VTOL rotor 30 is disposed above the mount 24, the motor 26, the power transmission mechanism 28, the variable pitch mechanism 32, and the inverter 34.

The pipes 42 constituting part of each boom 18 are connected to the front and rear of the mount 24, respectively. As a result, the mount 24 is supported by the pipes 42. The mount 24 supports the motor 26 and the variable pitch mechanism 32. The motor 26 is an AC motor. A rotation shaft of the motor 26 is connected to a hub 36 of the VTOL rotor 30 via the power transmission mechanism 28 such as a gear mechanism and a mast. The variable pitch mechanism 32 is disposed around the power transmission mechanism 28. The variable pitch mechanism 32 is located between the motor 26 and the VTOL rotor 30. The variable pitch mechanism 32 changes the pitch of blades 38 of the VTOL rotor 30. It should be noted that the VTOL rotor unit 20 may not include the variable pitch mechanism 32.

The inverter 34 is accommodated in the pipe 42. As a result, the inverter 34 is supported by the boom 18 (the pipe 42). The inverter 34 is connected to the motor 26 via a cable (not shown). The inverter 34 controls the rotational speed of the motor 26 by controlling the frequency of electric power supplied to the motor 26.

The pipes 42 are covered by the first fairing 44. Further, part of the VTOL rotor unit 20 is also covered by the first fairing 44. For example, the mount 24, the motor 26, the inverter 34, and the like are covered by the first fairing 44. On the other hand, the other part of the VTOL rotor unit 20 is covered by a second fairing 46. For example, the power transmission mechanism 28, the variable pitch mechanism 32, and the like are covered by the second fairing 46.

The second fairing 46 is connected to an upper portion of the first fairing 44. The second fairing 46 is a structure that protrudes from the first fairing 44 toward the VTOL rotor 30. A surface heat exchanger 50 is provided on an outer surface of the second fairing 46.

3. Structure of Surface Heat Exchanger 50

Figure 3:
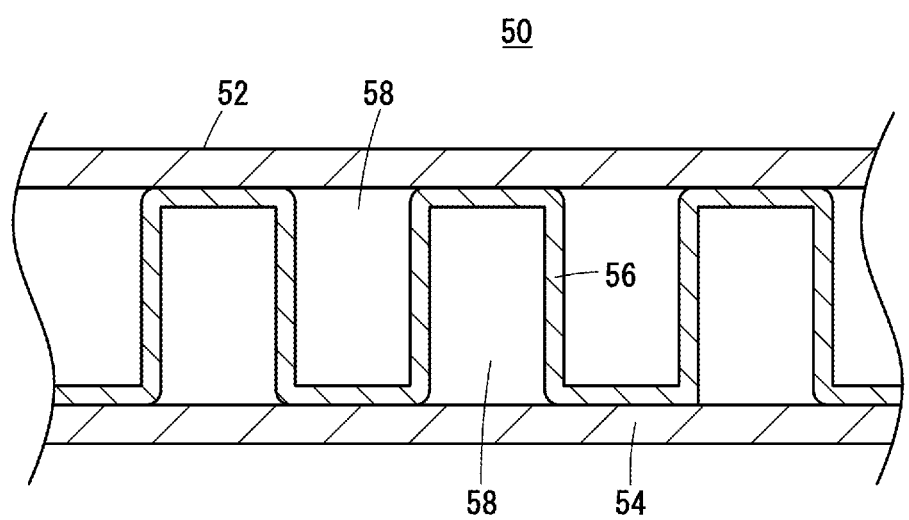
FIG. 3 is a horizontal sectional view showing part of a surface heat exchanger.

FIG. 3 is a horizontal sectional view of the surface heat exchanger 50. The surface heat exchanger 50 may be provided on the entire outer surface of the second fairing 46 or may be provided on part of the outer surface of the second fairing 46. The surface heat exchanger 50 includes a first plate 52, a second plate 54, and fins 56. The first plate 52 also serves as the outer surface of the second fairing 46. That is, the surface heat exchanger 50 and the second fairing 46 are integrally formed. The fins 56 are sandwiched between the first plate 52 and the second plate 54. The fins 56 are, for example, corrugated fins. A plurality of gaps 58 formed by the fins 56 extend vertically. Each gap 58 serves as a flow path for a refrigerant. It should be noted that the front surface heat exchanger 50 shown in FIG. 3 includes one layer of the fins 56, but may include a plurality of layers of the fins 56.

4. Aircraft Cooling System 60

Figure 4:
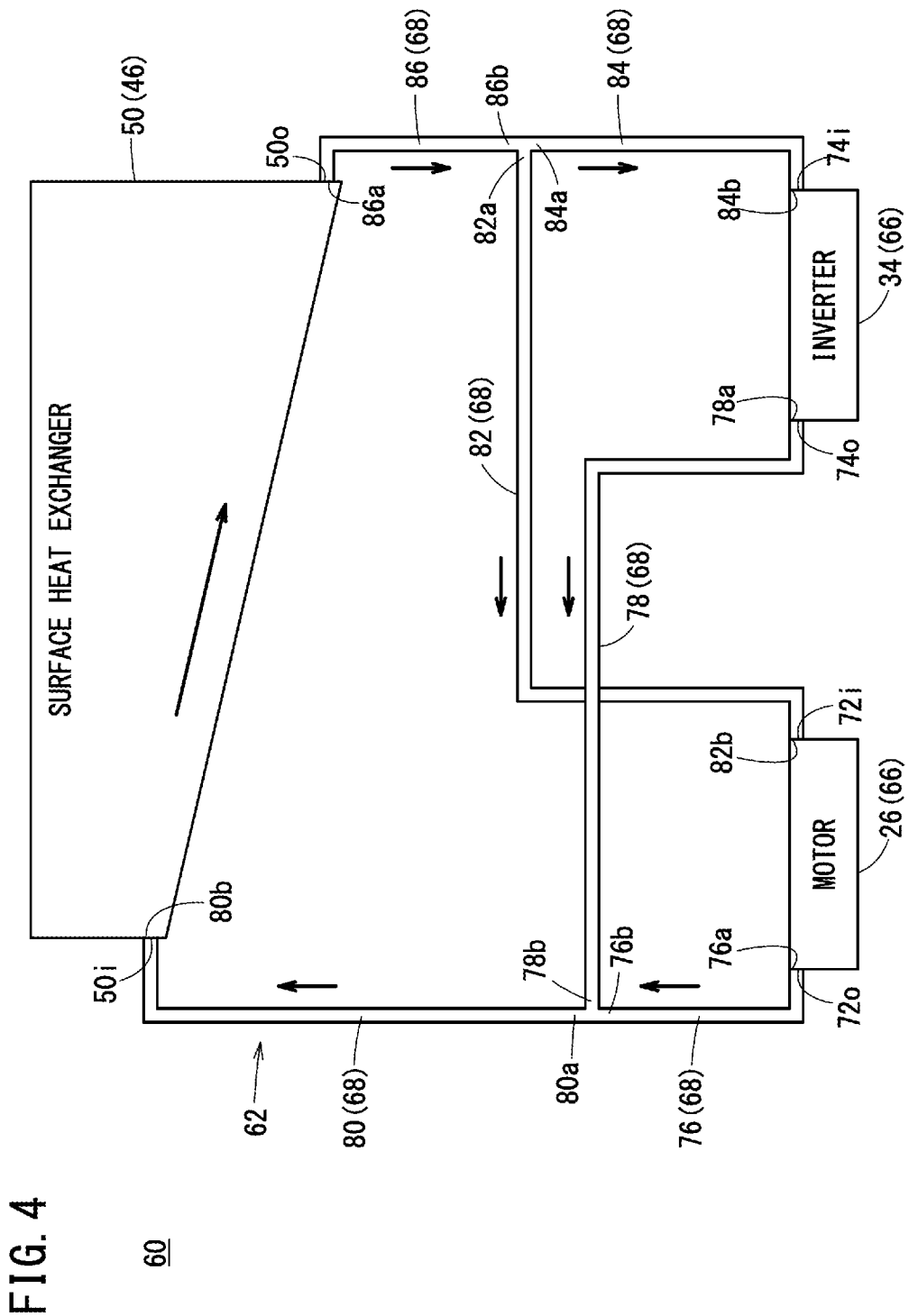
FIG. 4 is a cooling circuit diagram illustrating the aircraft cooling system according to the embodiment.

FIG. 4 is a cooling circuit diagram of an aircraft cooling system 60. The aircraft cooling system 60 is an evaporative cooling system. A cooling circuit 62 uses a refrigerant. The refrigerant can be a liquid or a gas in the cooling circuit 62. For example, Novec (registered trademark) having an insulating property may be used as the refrigerant. In the cooling circuit 62, there is a difference in specific gravity between the refrigerant in the liquid state and the refrigerant in the gaseous state. Due to this difference in specific gravity, the refrigerant naturally circulates in the cooling circuit 62. The cooling circuit 62 includes the surface heat exchanger 50 and a plurality of fluid pipes 68.

The VTOL aircraft 10 includes a heat generating member 66 that generates heat when the VTOL aircraft 10 flies. The heat generating member 66 includes one or more heating elements. Examples of the heating element include the motor 26, the inverter 34, and the like, but the heating element is not limited thereto. The heat generating member 66 is connected to the cooling circuit 62. Thus, the heat generating member 66 is directly cooled by the refrigerant. A heat exchanger may be connected to the heat generating member 66.

The motor 26 includes a motor inlet 72i for supplying the refrigerant to the inside of the motor 26, and a motor outlet 72o for discharging the refrigerant from the inside of the motor 26. Each of the motor inlet 72i and the motor outlet 72o is disposed at an upper portion of the motor 26. With such a structure, the refrigerant is supplied into the motor 26. Therefore, components (coils and the like) inside the motor 26 are directly cooled by the refrigerant. It should be noted that the motor 26 may be accommodated in a case, and an inlet and an outlet for the refrigerant may be disposed in the case.

The inverter 34 includes an inverter inlet 74i for supplying the refrigerant to the inverter 34, and an inverter outlet 74o for discharging the refrigerant from the inverter 34. Each of the inverter inlet 74i and the inverter outlet 74o is disposed at an upper portion of the inverter 34. With such a structure, the inverter 34 is directly cooled. The inverter 34 is preferably disposed at the same height position as the motor 26. It should be noted that the inverter 34 may be accommodated in a case, and an inlet and an outlet for the refrigerant may be disposed in the case.

As described above, the plurality of gaps 58 in the surface heat exchanger 50 each serve as the flow path for the refrigerant. The surface heat exchanger 50 performs heat exchange between the outside air and the refrigerant. The surface heat exchanger 50 includes a fairing inlet 50i that is an inlet of the flow path, and a fairing outlet 50o that is an outlet of the flow path.

The fluid pipes 68 include a first gas pipe 76, a second gas pipe 78, and a third gas pipe 80. An upstream end portion 76a of the first gas pipe 76 is connected to the motor outlet 72o. An upstream end portion 78a of the second gas pipe 78 is connected to the inverter outlet 74o. A downstream end portion 80b of the third gas pipe 80 is connected to the fairing inlet 50i. A downstream end portion 76b of the first gas pipe 76, a downstream end portion 78b of the second gas pipe 78, and an upstream end portion 80a of the third gas pipe 80 are connected to each other.

The fluid pipes 68 further include a first liquid pipe 82, a second liquid pipe 84, and a third liquid pipe 86. A downstream end portion 82b of the first liquid pipe 82 is connected to the motor inlet 72i. A downstream end portion 84b of the second liquid pipe 84 is connected to the inverter inlet 74i. An upstream end portion 86a of the third liquid pipe 86 is connected to the fairing outlet 50o. An upstream end portion 82a of the first liquid pipe 82, an upstream end portion 84a of the second liquid pipe 84, and a downstream end portion 86b of the third liquid pipe 86 are connected to each other.

The motor 26, the first gas pipe 76, the third gas pipe 80, the surface heat exchanger 50, the third liquid pipe 86, and the first liquid pipe 82 form a circulating flow path for the refrigerant. The inverter 34, the second gas pipe 78, the third gas pipe 80, the surface heat exchanger 50, the third liquid pipe 86, and the second liquid pipe 84 form a circulating flow path for the refrigerant.

In the present embodiment, the surface heat exchanger 50 is disposed at a position higher than the motor 26 and the inverter 34. Further, the fairing inlet 50i is disposed at a position higher than the fairing outlet 50o. Furthermore, the fairing outlet 50o is disposed at the lowest position on the surface heat exchanger 50. Such an arrangement allows the refrigerant to circulate without stagnating inside the cooling circuit 62.

The refrigerant is dropped into the motor 26 from the motor inlet 72*i*, for example. In the motor 26, the refrigerant in the liquid state absorbs heat from the motor 26. As a result, the motor 26 is cooled. On the other hand, the refrigerant is heated and vaporized. The vaporized refrigerant becomes a high-temperature and high-pressure gas. The refrigerant in the gaseous state flows out from the motor outlet 72*o* to the first gas pipe 76. Further, the refrigerant in the gaseous state flows through the first gas pipe 76 and the third gas pipe 80, and is introduced into the surface heat exchanger 50 from the fairing inlet 50*i*.

In the surface heat exchanger 50, the refrigerant in the gaseous state rises along the gaps 58 (FIG. 3). The refrigerant exchanges heat with the outside air via the fins 56 and the first plate 52. The first plate 52 (the outer surface of the second fairing 46) is cooled by receiving wind during cruising of the VTOL aircraft 10. Therefore, the surface heat exchanger 50 can efficiently perform heat exchange. The refrigerant in the gaseous state is cooled and liquefied. The liquefied refrigerant becomes a low-temperature and low-pressure liquid. The refrigerant in the liquid state falls to the bottom of the surface heat exchanger 50 and flows out from the fairing outlet 50*o* to the third liquid pipe 86. Further, the refrigerant in the liquid state flows through the third liquid pipe 86 and the first liquid pipe 82, and is supplied to the motor 26 from the motor inlet 72*i*.

As described above, the refrigerant transfers heat of the motor 26 to the second fairing 46 (the surface heat exchanger 50) and releases the heat to the outside air. Further, similarly to the heat of the motor 26, the refrigerant can also transfer heat of the inverter 34 to the second fairing 46 (the surface heat exchanger 50) and release the heat to the outside air.

According to the present embodiment, even when the VTOL rotor (s) 30 is/are stopped in the flight state, the parked state, or the like of the VTOL aircraft 10, the heat generating member 66 (the motor 26 and the inverter 34) can be cooled. That is, according to the present embodiment, it is possible to provide the aircraft cooling system 60 and the VTOL aircraft 10 (aircraft) that are capable of satisfactorily cooling the heat generating member 66.

In the present embodiment, the surface heat exchanger 50 also serves as the outer surface of the second fairing 46. As a result, the refrigerant can be cooled by the second fairing 46 without increasing the aerodynamic loss of the second fairing 46.

In the present embodiment, the refrigerant flows through the cooling circuit 62 by natural circulation. This eliminates the need for a pump. Accordingly, the number of components can be reduced. In addition, since a pump is not required, the weight of the VTOL aircraft 10 can be reduced. As a result, the fuel efficiency or the electric efficiency of the VTOL aircraft 10 can be improved.

5. Modified Embodiment

The present invention is not limited to the above disclosure, and various modifications are possible without departing from the essence and gist of the present invention.

For example, in the above embodiment, the case where the surface heat exchanger 50 is provided on the outer surface of the second fairing 46 has been described as an example, but the present invention is not limited thereto. FIG. 5 is a schematic view showing part of a vertical take-off and landing aircraft 10 according to a modified embodiment. As shown in FIG. 5, the second fairing 46 may include one or more holes 88 penetrating therethrough in the front-rear direction of the VTOL aircraft 10. The surface heat exchanger 50 may be provided on an inner surface of at least one hole 88. The surface heat exchanger 50 may be provided on both the outer surface of the second fairing 46 and the inner surface of the hole 88, which can increase the heat dissipation surface of the surface heat exchanger 50.

Further, in the above embodiment, the case where the surface heat exchanger 50 is provided on the outer surface of the second fairing 46 has been described as an example, but the present invention is not limited thereto. The surface heat exchanger 50 may be mounted in an upper portion of the second fairing 46. Further, the surface heat exchanger 50 may be provided in a structure other than the second fairing 46.

Furthermore, in the above embodiment, the case where the cooling circuit 62 does not include a pump has been described as an example, but the present invention is not limited thereto. The cooling circuit 62 may include a pump. This allows the refrigerant to be more flowable, and thus the respective heat exchangers can be more freely arranged.

6. Appendices

The following notes (appendices) are further disclosed in relation to the above-described embodiment.

(Appendix 1)

The aircraft cooling system (60) includes: the rotor (30) configured to generate thrust in the vertical direction; the heat generating member (66) disposed below the rotor; the support member (18) configured to support the heat generating member; the structure (46) protruding from the support member toward the rotor; and the heat exchanger (50) provided in the structure, wherein the refrigerant heated by the heat generating member is introduced to the inlet (50*i*) provided in the heat exchanger, and the refrigerant cooled by the heat exchanger is supplied to the heat generating member from the outlet (50*o*) provided in the heat exchanger. According to such a configuration, even when the VTOL rotor (s) is/are stopped, the heat generating member can be cooled. That is, according to such a configuration, it is possible to provide an aircraft cooling system capable of satisfactorily cooling the heat generating member.

(Appendix 2)

In the aircraft cooling system according to Appendix 1, the heat exchanger may be provided on the outer surface of the structure. According to such a configuration, the refrigerant can be cooled by the structure without increasing the aerodynamic loss of the structure.

(Appendix 3)

In the aircraft cooling system according to Appendix 1 or 2, the structure may include the hole (88) penetrating in the front-rear direction of the aircraft, and the heat exchanger may be provided on the inner surface of the hole.

(Appendix 4)

In the aircraft cooling system according to any one of Appendices 1 to 3, the refrigerant may reach the inlet in a state of being vaporized by the heat generating member, and may flow out from the outlet in a state of being liquefied by the heat exchanger. According to such a configuration, the refrigerant flows by natural circulation. This eliminates the need for a pump. Accordingly, the number of components can be reduced. In addition, since a pump is not required, the weight of the VTOL aircraft can be reduced. As a result, the fuel efficiency or the electric efficiency of the VTOL aircraft can be improved.

(Appendix 5)

In the aircraft cooling system according to any one of Appendices 1 to 4, the heat generating member may include at least one of the motor (26) configured to rotate the rotor, or the inverter (34) connected to the motor.

(Appendix 6)

In the aircraft cooling system according to any one of Appendices 1 to 5, the rotor may be stopped during cruising of the aircraft.

(Appendix 7)

The aircraft cooling system according to any one of Appendices 1 to 6 may further include the variable pitch mechanism (32) disposed below the rotor and configured to change the pitch of the blade (38) of the rotor, and the structure may be a cover configured to cover the periphery of the variable pitch mechanism.

(Appendix 8)

The aircraft (10) includes the aircraft cooling system according to any one of Appendices 1 to 7.

The invention claimed is:

1. An aircraft cooling system comprising:
    a rotor configured to generate thrust in a vertical direction;
    a heat generating member disposed below the rotor;
    a support member configured to support the heat generating member;
    a structure protruding from the support member toward the rotor; and
    a heat exchanger provided in the structure,
    wherein a refrigerant heated by the heat generating member is introduced to an inlet provided in the heat exchanger,
    the refrigerant cooled by the heat exchanger is supplied to the heat generating member from an outlet provided in the heat exchanger,
    the heat exchanger is provided along a side surface of the structure,
    the heat exchanger is disposed at a position higher than the heat generating member,
    the inlet and the outlet are disposed at positions higher than the heat generating member, and
    the inlet is disposed at a position higher than the outlet.

2. The aircraft cooling system according to claim 1, wherein
    the heat exchanger is provided on an outer surface of the structure.

3. The aircraft cooling system according to claim 1, wherein
    the structure includes a hole penetrating in a front-rear direction of an aircraft, and
    the heat exchanger is provided on an inner surface of the hole.

4. The aircraft cooling system according to claim 1, wherein
    the refrigerant reaches the inlet in a state of being vaporized by the heat generating member, and flows out from the outlet in a state of being liquefied by the heat exchanger.

5. The aircraft cooling system according to claim 1, wherein
    the heat generating member includes at least one of a motor configured to rotate the rotor, or an inverter connected to the motor.

6. The aircraft cooling system according to claim 1, wherein
    the rotor is stopped during cruising of an aircraft.

7. The aircraft cooling system according to claim 1, further comprising a variable pitch mechanism disposed below the rotor and configured to change a pitch of a blade of the rotor, wherein
    the structure is a cover configured to cover a periphery of the variable pitch mechanism.

8. An aircraft comprising the aircraft cooling system according to claim 1.

9. The aircraft cooling system according to claim 1, wherein
    the outlet is disposed at a lowest position of the heat exchanger.

10. The aircraft cooling system according to claim 1, wherein
    the heat exchanger is mounted in an upper portion of the structure.

* * * * *